Figure 1:
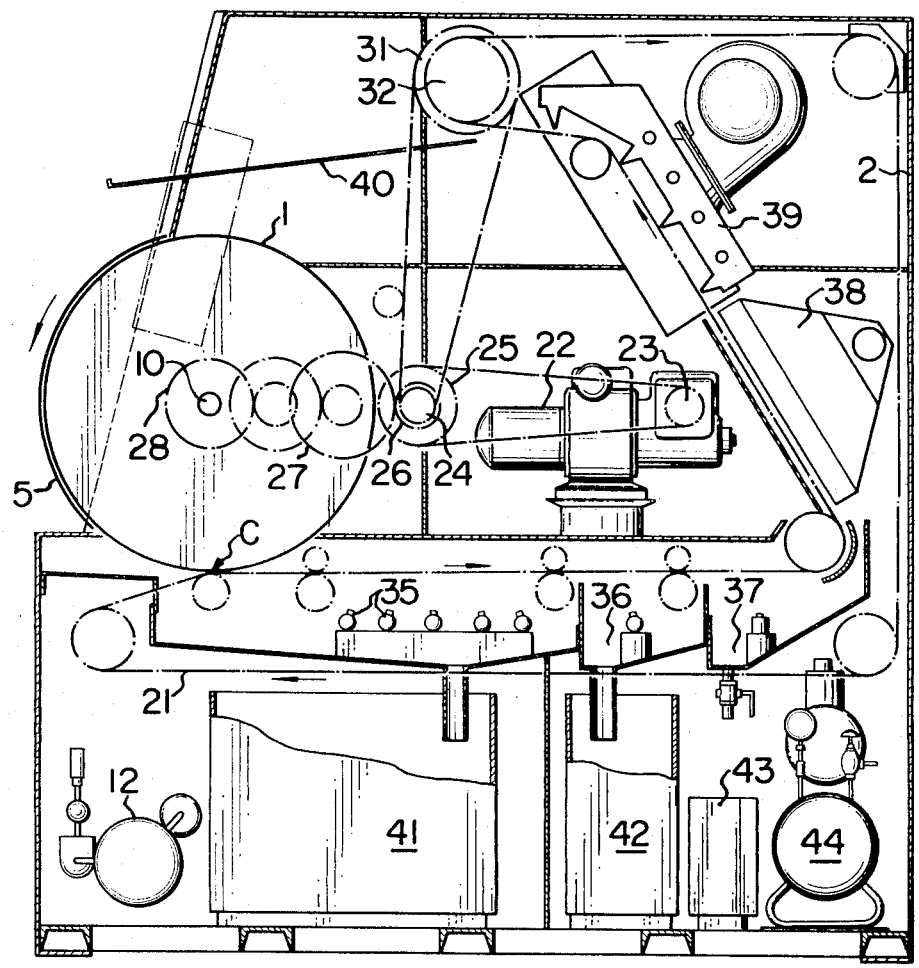

United States Patent [19]
Yamada et al.

[11] 3,846,817
[45] Nov. 5, 1974

[54] APPARATUS FOR CONVEYING SYNTHETIC RESIN-MADE ARTICLES IN THE SHEET FORM

[75] Inventors: Takao Yamada, Kawasaki; Kiyoshi Sunakawa, Yamato, both of Japan

[73] Assignees: Asahi Kasei Kogyo Kabushiki Kaisha, Osaka; Toshiba Machine Co., Ltd., Tokyo, both of, Japan

[22] Filed: Aug. 31, 1973

[21] Appl. No.: 393,366

[30] Foreign Application Priority Data
Sept. 4, 1972  Japan............................... 47-88462

[52] U.S. Cl.................................. 354/319, 355/91
[51] Int. Cl............................................... G03d 3/08
[58] Field of Search........ 95/89 F, 89 R, 94 R, 100, 95/73

[56] References Cited
UNITED STATES PATENTS
2,734,436  2/1956  Hills................................. 95/94 R
3,087,406  4/1963  Dutch................................ 95/94 R
3,559,558  2/1971  Hamlin.............................. 95/89 R
3,593,641  7/1971  Adams et al....................... 95/89 R
3,608,464  9/1971  Harrell et al....................... 95/89 R

*Primary Examiner*—Richard L. Moses
*Attorney, Agent, or Firm*—Sughrue, Rothwell, Mion, Zinn & MacPeak

[57] ABSTRACT

An apparatus for conveying thin sheet-like plastic articles which comprises a controllably intermittently rotatable, vacuum suction drum and a pair of endless chains respectively continuously travelling through just under the end walls of the drum, to mount the sheet-like article loosely on the drum and then transfer it onto the endless chains easily and securely. The apparatus may conveniently be used in conveying printing plate blanks through necessary treating devices by which they are sequentially treated to produce desired printing plates therefrom.

2 Claims, 6 Drawing Figures

APPARATUS FOR CONVEYING SYNTHETIC RESIN-MADE ARTICLES IN THE SHEET FORM

This invention relates to an apparatus for conveying synthetic resin-made articles in the sheet form. More particularly it relates to a chain conveyor type apparatus for conveying such sheet-like articles which comprises a controllably intermittently rotatable, vacuum suction drum and a pair of endless chains respectively continuously travelling through just under the end walls of the drum, to mount the sheet-like article loosely on the drum and then transfer it onto the endless chains easily and securely.

Typical of the sheet-like synthetic resin-made article is a layer of photosensitive material supported with a flexible backing material capable of transmitting actinic radiation onto said layer, the whole mass having been exposed to actinic radiation through an image-bearing transparency. The typical article, which is a blank for a relief printing plate for printing, for example, newspaper, is subjected to various treatments as mentioned later in order to produce a printing plate therefrom.

However, the conventional chain conveyor system is defective in that it is time-consuming to fit such an exposed, backing material-supported photosensitive layer to the chains since this layer is thin as a whole.

This invention has been made to solve the aforementioned problems heretofore raised in the art.

Figure 2:
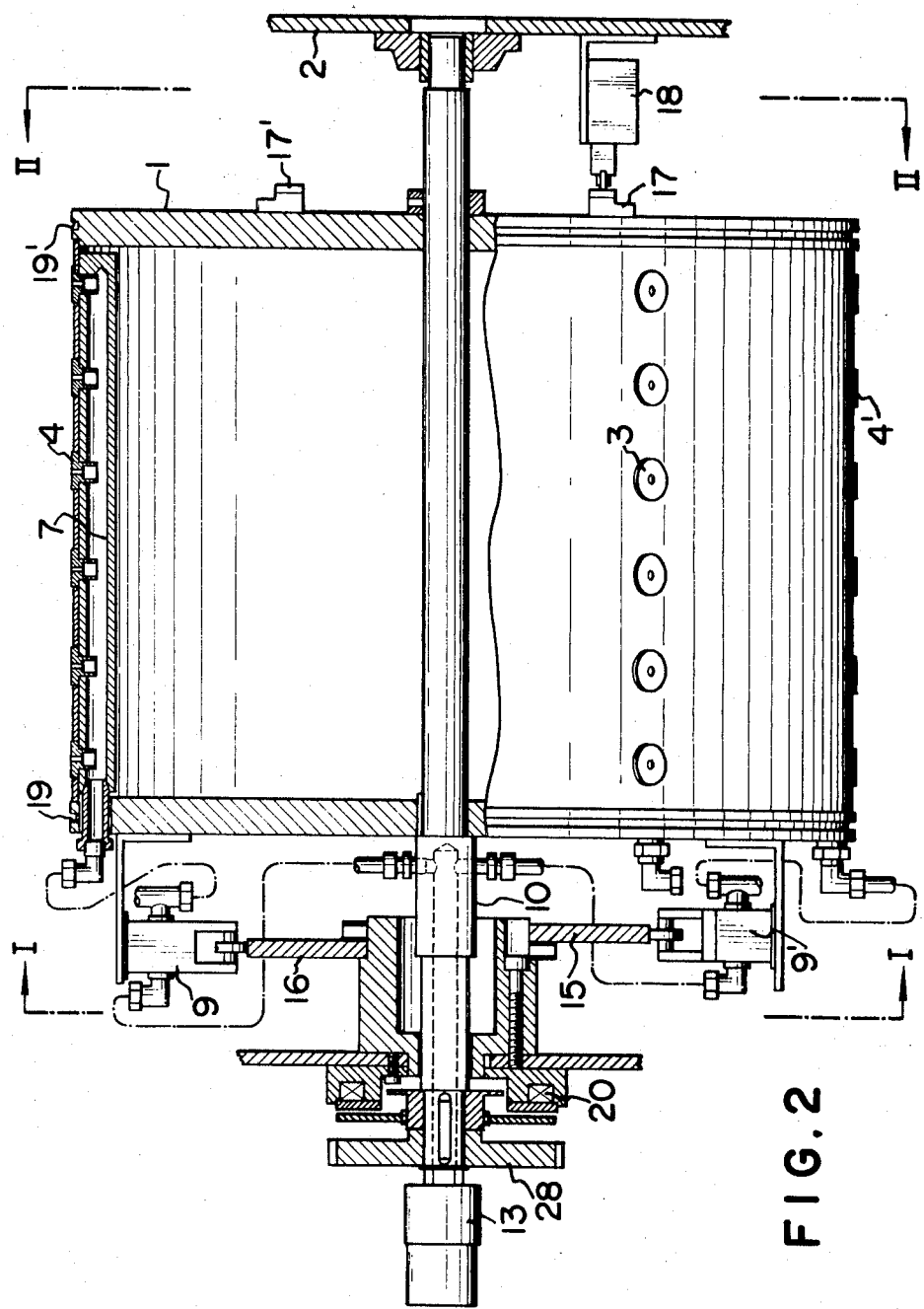
Figure 3:
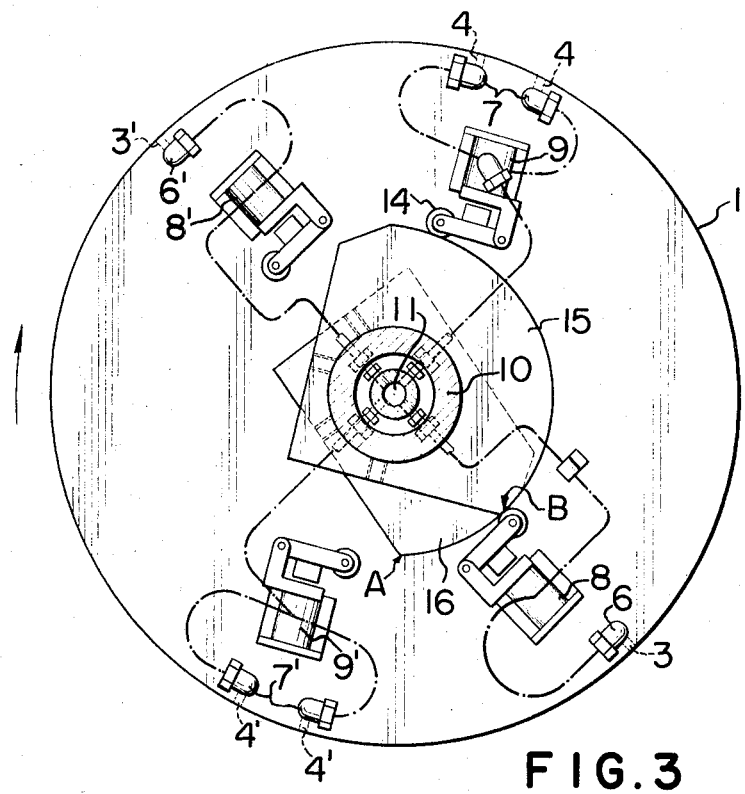
Figure 4:
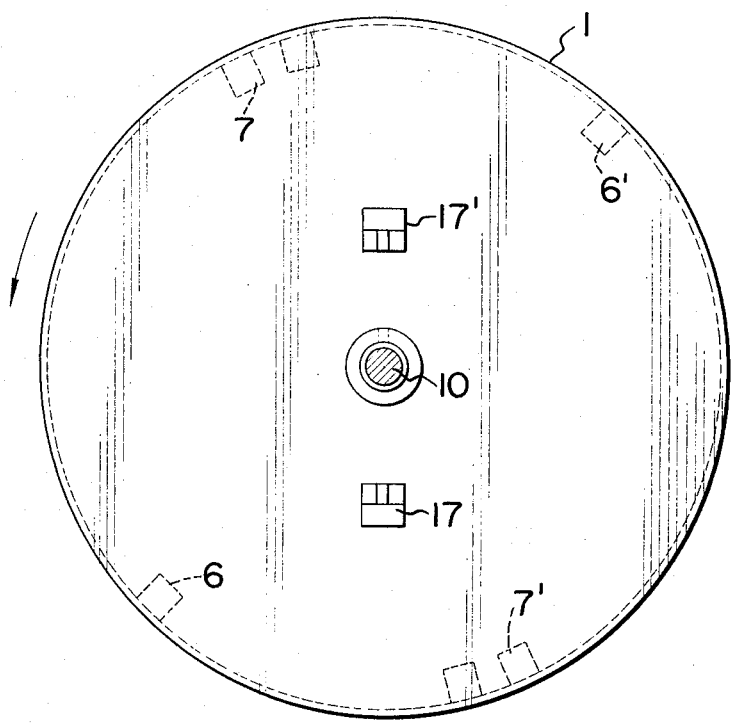
Figure 5:
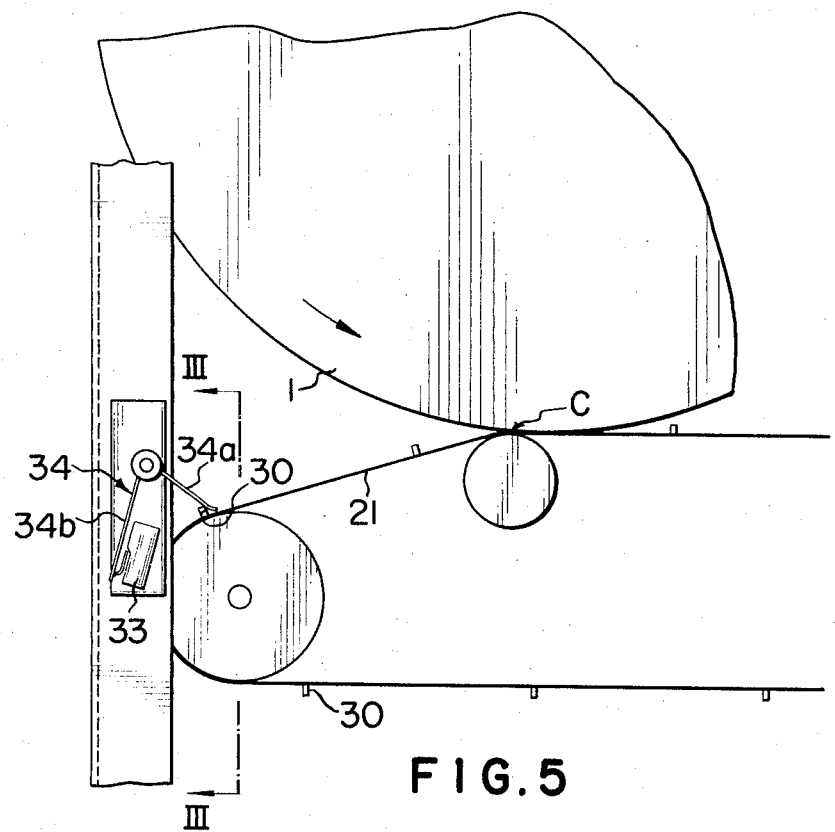
Figure 6:
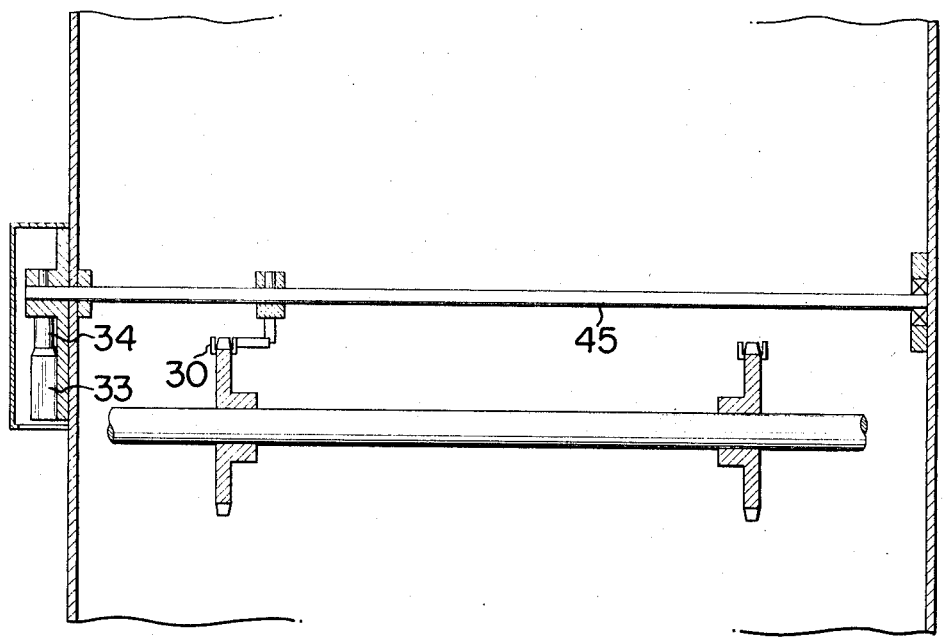

A preferred embodiment of this invention will be detailed hereunder with reference to the accompanying drawings, in which:

FIG. 1 is a side view generally illustrating the chain conveyor type apparatus embodying this invention, FIG. 2 is a frontal view showing the essential parts of the apparatus of FIG. 1, FIG. 3 is a sectional view taken along lines I—I of FIG. 2, FIG. 4 is a sectional view taken along lines II—II of FIG. 2, FIG. 5 is an enlarged view of a device for fitting a printing plate blank to the chains of the apparatus of FIG. 1, and FIG. 6 is a sectional view taken along lines III—III of FIG. 5.

For example, the relief printing plate may be prepared by placing (1) an image-bearing transparency, e.g., a negative film on a glass sheet transparent to actinic light, (2) covering the negative film with a protective plastic film substantially transparent to actinic light, (3) depositing a photosensitive material upon a protective film to form a layer of 0.1 mm. to 10 mm. in thickness, (4) placing a backing material on the layer according to the process and apparatus as described in German DOS No. 2,029,238, (5) putting a glass sheet transparent to actinic light on the backing material, (6) exposing the resulting assembly to actinic light, first from the backing material side and second from the negative film side, simultaneously from the support material side and the negative film side, or only from the negative film side, (7) removing the glass sheets and the negative film from the assembly thereby obtaining a printing plate blank covered with the protective film, (8) peeling the protective film off the printing plate blank, (9) washing out the unexposed or unhardened portions of the photosensitive layer of the blank and (10) treating the thus-washed blank with a suitable aqueous treating solution or emulsion to prepare the relief printing plate.

The photosensitive materials which may be used are detailed in, for example, U.S. Pat. Nos. 3,628,963 and 3,663,222, U.S. Pat. application Ser. No. 291,992 and Japanese Pat. Publication No. 46-29525.

Examples of suitable backing materials include plastics such as polyester, polyamide, polyvinyl chloride, polyvinylidene chloride, polymethyl methacrylate, polystyrene and cellulose ester films and plates. The thickness of these backing materials is preferably in the range of 50 microns to 2.0 mm.

Also an adhesive anchor layer may be provided on such support materials. The adhesive anchor layer is composed of a synthetic resin or polymer such as an alkyl resin, urethane resin, epoxy resin, melamine resin or synthetic rubber. The thickness of the adhesive anchor layer is preferably in the range of 0.1 micron to 0.3 mm. The adhesive anchor layer may contain a photopolymerization initiator when transparent support materials are used as described in German DOS No. 2,031,476.

Examples of suitable substantially transparent plastic films include films, foils or membranes of polypropylene, polyvinyl chloride, polymethyl methacrylate, polyvinyl alcohol, polyvinyl alcohol hardened by esterification and/or etherification, cellulose acetate such as secondary cellulose acetate and cellulose triacetate as well as polyester, which preferably have a thickness of about 0.001 mm to about 0.1 mm.

When photosensitive materials are exposed to actinic light through an image-bearing transparency, e.g., a negative or positive photographic film, the areas corresponding to the transparent portions are photopolymerized in about 1 second to 60 minutes and the opaque areas, i.e., unexposed areas, remain substantially un-photopolymerized. These non-exposed areas may be washed away with a solvent liquid such as water, an aqueous solution or an organic solvent. Exemplary solvent liquids include aqueous solutions of sodium carbonate, sodium bicarbonate, potassium carbonate, hydrochloric acid, sulfuric acid, nitric acid, acetic acid; aqueous solutions of methanol, ethanol, isopropanol and acetone; methanol, ethanol, isopropanol, acetone, methylethyl ketone, ethyl acetate, butyl acetate, dioxane, tetrahydrofuran, phenol, ether, benzene, toluene, gasoline, kerosene, light oil, trichloroethylene or the mixtures thereof. (U.S. Pat. application No. 318,284).

The surface treating agents used herein are described in, for example, U.S. Pat. application No. 318,284.

Actinic light which may be used in photopolymerizing the photosensitive material, should preferably have wave lengths of from 2,000 to 8,000 Angstroms. Practical sources of such actinic radiation include carbon arc lamps, super high pressure mercury lamps, high pressure mercury lamps, low pressure mercury lamps, xenon lamps, ultra violet fluorescent lamps and sunlight.

The chain conveyor type apparatus of this invention may conveniently be used in conveying the printing plate blank for its treatments in steps to be described later.

Referring to FIGS. 1 to 6, a vacuum suction drum 1 is rotatably supported with part of the peripheral surface thereof protruded from the upper side of the front of a casing 2 and is designed to stop every time it is rotated by a certain angle such as 180° in the direction indicated by an arrow symbol (see particularly FIG. 1). As shown in FIGS. 2 and 3, on the peripheral surface of the drum 1 are juxtaposed pairs of suction apertures 3 and 4 as well as pairs of those 3' and 4', the pairs of the suction apertures being designed to enable a printing plate blank 5 to be attached at both the upper and lower edges to the peripheral surface of the drum 1 by applying vacuum to said apertures from within the drum 1 when just contacting the blank 5 therewith. The suction aperture 3 is connected to the suction pipe (not shown) of a vacuum pump 12 via pipe 6 extending from the aperture 3 through an operating valve 8 provided near a point of the outer sidewall of the drum 1, at which point the pipe 6 penetrates the sidewall, to a communicating channel 11 within the shaft of the drum 1 and via the channel 11. The suction apertures 4 are also connected to the suction pipe (not shown) of the vacuum pump 12 via pipes 7 extending from the apertures 4 through an operating valve 9 provided near a point on the outer sidewall of the drum 1, at which point the pipes 7 penetrate the sidewall, to the communicating channel leading to the suction pipe (not shown) of the vacuum pump 12. The other suction apertures 3' and 4' are likewise connected to the suction pipe of the vacuum pump 12 via pipes 6', 7', operating valves 8', 9', and the communicating channel 11, respectively. A rotary joint designated at 13 is fitted to the end of the shaft 10 to connect the communicating channel 11 to the suction pipe (not shown) of the vacuum pump 12.

The aforesaid operating valves 8, 9, 8' and 9' are each provided with a contact roll 14 which is movable in the nearly centripetal direction along the sidewall of the drum 1, and they are usually in the closed position except that they are opened to exert vacuum suction at the suction apertures for a period of time during which the contact roll 14 moves while contacting cam plates 15 and 16 having each an arcuated peripheral edge so that it turns around the shaft 10 as the drum 1 rotates, the plates being disposed on, and in parallel with, the inner side of the sidewall of the casing 2.

In this case, the operating valves 8 and 8' are respectively adjusted to stop the vacuum suction by allowing their respective contact rolls 14 to be disengaged from the peripheral edge of the cam plate 16 at the terminal point A when their related suction apertures 3 and 3', respectively reach the lowest point C of the drum 1 as the drum 1 rotates, the lowest point C being a transfer position at which the printing plate blank 5 on the drum 1 is transferred onto chains 21. On the other hand, the operating valves 9 and 9' are respectively adjusted to stop the vacuum suction by allowing their respective contact rolls 14 to be disengaged from the peripheral edge of the cam plate 15 at the terminal point B when their related suction apertures 14 and 14', respectively reach a predetermined point somewhat upstream of the transfer position as the drum 11 rotates.

With particular reference to FIG. 2, the drum 1 is provided at the other side wall with two protrudent dogs 17 and 17' in symmetrical relation with respect to the shaft 10 and these dogs are able to come into contact with the contact piece of a limit switch 18 for controlling the drum stopping position, which switch is protrudently fitted to the inner side of the sidewall of the casing 2. When the limit switch 18 is opened, an electric motor 22 is ceased to drive while an electromagnetic brake 20 is actuated.

There will then be explained hereunder a system for driving the drum 1 and a pair of endless chains 21 to which the printing plate blank is to be transferred from the drum 1. Referring particularly to FIG. 1, the electric motor 22 with its reduction gears is disposed at the upper middle part of the casing 2, and a sprocket wheel 23 securely fixed to the output shaft of the motor 22 is connected by a chain with a sprocket wheel 25 which is coaxial with a sprocket wheel 24. A spur gear 26 coaxially connectable with the sprocket wheel 25, is in combination with a three-stage reduction type gear train 27 driven by the spur gear 26, and a gear 37 driven by the gear train 27 is secured to the shaft 10 of the drum 1. The aforesaid pair of endless chains 21 continuously travel in parallel to each other through just under the side walls of the drum 1 and through the rear part of the casing 2 towards the upper middle part thereof. In addition, the chains are respectively provided in a predetermined space with needle-like projections 30 which can be engaged with the respective annular grooves 19 and 19' which are respectively formed on the peripheries of the sidewalls of the drum 1. When these projections 30 are to be engaged with the annular grooves 19, 19' of the drum 1 to the peripheral surface of which the printing plate blank 5 is attached by means of the vacuum suction, they will penetrate through the edges of the blank 5 into the grooves as the chains 21 move thereby transferring the blank 5 on the drum 1 onto the chains 21 at the transferring position C. The chains 21 are driven in the direction indicated by an arrow symbol, by the electric motor 22 through a driving power-transfer mechanism consisting of the sprocket wheel 24 connected by a chain with a sprocket wheel 31 which is in coaxial relation with a sprocket wheel 32 rotatably supported at the upper middle part of the casing 2.

The drum 1 and the chains 21 are designed such that when they are driven, the peripheral speed of the former is just equal to the travelling speed of the latter.

With particular reference to FIGS. 1, 5 and 6, a limit switch 33 when closed has the spur gear 26 coupled with the sprocket wheel 25 in the aforesaid drum-drive mechanism to drive the drum 1. The sequence of operations of the apparatus of this invention is generally as follows.

1. Place a printing plate blank 5 on the peripheral surface of the drum 1.

2. Close a power switch (not shown) for the vacuum pump 12 to render vacuum the system comprising the vacuum pump 12, operating valve 9, pipe 7 and suction apertures 14 thereby attaching the printing plate blank 5 to the peripheral surface of the drum 1.

3. Close a main switch (not shown) interposed on the line between the limit switch 33 and the power source.

4. Allow one of the projections 30 to rotatably move a forked lever 34 thereby closing the limit switch 33. The forked lever 34 having tines 34a and 34b and being fixed on one end of an axle 45 pivotally supported by the sidewalls of the casing 2, when the tine 34a is pushed up by one of the projections 30 of the travelling chains, is rotatably moved to contact the tine 34b with the contact piece of the limit switch 33 (that is, close this switch) thereby driving the drum 1 while releasing the electromagnetic brake 20.

Every time the drum 1 is rotated by 180° in this embodiment, a limit switch 18 is contacted alternately with projections 17 and 17' fitted to the drum side wall facing the switch 18 so as to uncouple the spur gear 26 from the sprocket wheel 15 thereby stopping the operation of the drum-driving mechanism while returning to the opened position a switch for the vacuum pump 12 and the main switch (not shown) interposed on the line between the limit switch 33 and the power source.

Both the projection 30 of the chains 21 in motion, which has caused the drum 1 to drive in cooperation with the lever 34 and limit switch 33, and the leading end of the printing plate blank 5 attached to the drum 1 simultaneously reach the transferring position C where said and other projections 30 penetrate the edges of the blank 5 in sequence thereby transferring the blank 5 from the drum 1 to the chains 21.

Arranged in sequence along the travelling path of the chains 21 are a washing-out device 35 including a group of nozzles for ejecting upward a washing-out solution towards the blank 5 on the chains 21, a pair of rollers and a reservoir 41 for said solution, a rinsing device 36 including nozzles for ejecting upward water, a pair of rolls and a water reservoir 42, a surface treating device 37 including nozzles for ejecting upward a treating agent solution and a reservoir 43 for this solution, a supplemental exposure device 38 which radiates actinic light obliquely downward on the thus-treated blank 5, and a drying device 39 which blows air downward on the supplementarily exposed blank 5 to obtain therefrom a printing plate (not shown) as the end product. The printing plate is then recovered through an outwardly inclined delivery plate 40 supported under the rear part of the path of the chains 21 and partly protruded from the upper front wall of the casing 2.

As mentioned above, reference numerals 41, 42 and 43 designate the reservoirs used in the washing-out, rinsing and surface treating devices, respectively. Reference numeral 44 designates a compressor for supplying compressed air.

The washing-out device 35 and the rinsing device 36 are started to operate upon the limit switch 33 being closed, the surface treating device 37 is started to operate at the same time that a limit switch (not shown) detects the arrival of the leading end of the printing plate blank 5, and the supplemental (or finishing) exposure device 38 and the drying device 39 are respectively designed to start their operations after lapse of predetermined times subsequent to the commencement of operation of the surface treating device 37.

The treatment of the printing plate blank 5 by the use of the chain conveyor type apparatus of this invention will be summarized as follows.

The printing plate blank 5 is placed on the frontal part of the peripheral surface of the drum 1, securely attached to said frontal part by means of vacuum suction applied through the vacuum apertures 3, 4 of the drum 1 to the leading and trailing ends of the blank 5, respectively, the vacuum being obtained by actuating the vacuum pump 12 by operating a pedal or the like for the activation, and then freed of a protective film if the blank 5 is still covered therewith. This film may be peeled off the blank 5 before placing on the drum. Then, the electric motor 22 is driven to allow the chains 21 to travel along the defined path thereof thereby causing one of the projections 30 to close the limit switch 33 with the result that the drum 1 is started to rotate at a peripheral speed which is the same as the travelling speed of the chains 21. These projections 30 start insertion through both the edges of the blank 5 into the annular grooves 9, 9' of the drum 1 when the leading or forward end of the blank 5 reaches the lowest point of the drum 1 which is the transferring position C. The moment the suction aperture 3 passes the transferring position C and the contact roll of the operating valve 8 goes beyond the terminal point A of the cam plate 16, the vacuum suction through the aperture 3 is terminated thereby separating the forward end of the blank 5 from the surface of the drum 1 and attaching it to the chains 21 with aid of the projections 30. In this case, the transfer of the blank 5 from the drum to the chains is satisfactorily conducted because the peripheral speed of the drum is equal to the travelling speed of the chains. As soon as the drum 1 is further turned to the extent the suction apertures 4 reach the transferring position C and the contact roll of the operating valve 9 is disengaged from the arcuated edge of the cam plate 15 at the terminal point B thereof, the vacuum suction at the suction apertures 4 is terminated. Accordingly, the trailing or rear end of the blank 5 is also off the drum 1 and transferred onto the chains 21 by other projections 30 thereof. When the drum 1 is further rotated by 180°, the limit switch 18 is opened to uncouple the spur gear 26 from the sprocket wheel 15 and actuate the electromagnetic brake 20 so that it stops the rotation of the drum 1. After the discontinuation of rotation of the drum 1, the chains 21 with the blank 5 attached thereto still continue to travel through the aforesaid devices for washing-out of the unhardened portion, aqueous rinsing, surface treating, supplemental exposure and drying, by which devices the blank is sequentially treated as it travels with the chains 21. The blank 5 is thus treated to obtain therefrom the desired printing plate which is then withdrawn through the inclined plate 40 from the casing 2.

As is seen from the foregoing, the apparatus of this invention has the following advantages.

1. The printing plate blank placed on the peripheral surface of the rotatably supported drum having the annular groove formed on each of the end portions, can conveniently be transferred and secured at both the edges onto the chain provided with needle-like projections since the projections are inserted through the edges of the blank into the grooves.

2. The needle-like projections of the chains serve to secure the printing plate blank at both the edges to the chains without slackening the blank since the drum rotates at a peripheral speed equal to the travelling speed of the chains. This, in cooperation with the advantage mentioned in the preceding paragraph (1), ensures a convenient transfer of the blank from the drum to the chains.

3. The attachment of the printing plate blank to the peripheral surface of the drum can easily be effected since the drum is provided on the peripheral surface with the suction apertures. In addition to this the termination of vacuum suction is automatically effected at the transferring position where the forward end of the blank on the drum comes nearest the chains, thereby ensuring easy and reliable transfer of the blank from the drum to the chains by the use of the needle-like projections.

As is clear from the above, this invention is very practically useful.

What is claimed is:

1. An apparatus for conveying synthetic resin-made articles in the sheet form, comprising
    a rotatably supported drum provided at the peripheral surface with vacuum suction apertures for retaining a synthetic resin-made, sheet-like article on said surface and also provided at the periphery of the end portions with annular grooves, and
    a pair of endless chains continuously movable through a transferring position under and near the end portions of said drum at a predetermined speed and having needle-like projections thereon at a predetermined spacing, which projections are capable of insertion through said sheet-like article at both the edges into said grooves of the drum while terminating the vacuum suction during the passage of said article through the transferring position whereby said article is transferred from said drum to said chains,
    said drum being started to rotate at a peripheral speed equal to the travelling speed of said chains when one of the projections contacts a limit switch disposed at a predetermined position to close it prior to the arrival of the forward end of said article at the transferring position and, on the other hand, the rotation of said drum being automatically discontinued when the rear end of said article is passed through the transferring position.

2. An apparatus for conveying a printing plate blank through devices for its treatment, the printing plate blank consisting of a photosensitive material layer supported with a flexible backing material capable of transmitting actinic radiation onto said layer and having been exposed to actinic radiation through an image-bearing transparency, which comprises:
    a rotatably supported drum provided at the peripheral surface with vacuum suction apertures for retaining the printing plate blank on said surface and also provided at the periphery of the end portions with annular grooves,
    a pair of endless chains continuously movable through a transferring position under and near the end portions of said drum at a predetermined speed and having needle-like projections thereon at a predetermined spacing, which projections are capable of insertion through said blank at both the edges into said grooves of the drum while terminating the vacuum suction during the passage of said blank through the transferring position whereby said blank is transferred from said drum to said chains,
    said drum being started to rotate at a peripheral speed equal to the travelling speed of said chains when one of the projections contacts a limit switch disposed at a predetermined position to close it prior to the arrival of the forward end of said blank at the transferring position and, on the other hand, the rotation of said drum being automatically discontinued when the rear end of said blank is passed through the transferring position,
    a washing-out device to wash out the unhardened portions of the exposed photosensitive material layer of said blank with a washing-out solution,
    a surface treating device to treat the surface of the photosensitive material layer so washed out, and a supplemental exposing device to subject the thus-treated blank to supplemental actinic radiation to obtain a desired printing plate therefrom.

* * * * *